US005693413A

United States Patent [19]
Hesterman et al.

[11] Patent Number: 5,693,413
[45] Date of Patent: Dec. 2, 1997

[54] MOLDABLE MATERIALS UTILIZING RECYCLABLE SUBSTANCES

[75] Inventors: Larry C. Hesterman; Harold Moen, both of Regina, Canada

[73] Assignee: Magnum Industries Ltd., Regina, Canada

[21] Appl. No.: 382,600

[22] Filed: Feb. 2, 1995

[30] Foreign Application Priority Data

Feb. 24, 1994 [CA] Canada ................................. 2116418

[51] Int. Cl.$^6$ ..................................................... B32B 18/00
[52] U.S. Cl. ...................... 428/325; 428/327; 428/423.9; 428/492; 525/92; 525/130; 524/494
[58] Field of Search .................. 525/92, 130; 524/494; 428/423.9, 492, 325, 327

[56] References Cited

U.S. PATENT DOCUMENTS

| 4,452,920 | 6/1984 | Joubert | 521/109.1 |
| 4,492,728 | 1/1985 | Zurkinden | 428/240 |
| 4,833,205 | 5/1989 | Bauman et al. | 525/123 |
| 5,182,137 | 1/1993 | Allen . | |
| 5,385,953 | 1/1995 | McClellan | 521/109.1 |

FOREIGN PATENT DOCUMENTS

| 904458 | 7/1972 | Canada . |
| 1029889 | 4/1978 | Canada . |
| 1237212 | 5/1988 | Canada . |

*Primary Examiner*—E. Rollins Buffalow
*Attorney, Agent, or Firm*—Pearne, Gordon, McCoy & Granger LLP

[57] ABSTRACT

A moldable material includes chipped or stripped rubber intermingled with a curable binder. It may also include ground glass in an amount of from 0% to 55% by weight. The binder is chosen from the group including aromatic urethane binders, aliphatic urethane binders, latex binders and epoxy binders.

11 Claims, No Drawings

MOLDABLE MATERIALS UTILIZING RECYCLABLE SUBSTANCES

BACKGROUND OF THE INVENTION

The present invention relates to the field of building materials, and in particular building materials utilizing recycled rubber and glass materials.

DESCRIPTION OF RELATED ART

It is widely known that garbage disposal is a significant problem throughout North America. Two particular areas of concern have been, and continue to be, the disposal of automobile tires and glass from non-refillable containers. In the case of tires, these are usually stored in massive tire dumps, since they are unsuitable for land fill. Tire dumps, however, are a blight on the landscape and can be a significant fire hazard.

In the case of bottles, flint, or clear glass, they are relatively easily recycled, and can be used in a variety of ways, for instance, in the production of new bottles, or in fibreglass production. Colored glass, however, is often placed in landfills, where it occupies valuable space, and loses any potential value it may have.

The object of the present invention, therefore, is to provide a new and useful product that is manufactured primarily from rubber and glass scrap. It is a further object to produce a durable, resilient block material for use in manufacturing products such as curbs, road markers, patio blocks, barriers and weights to hold down warning cones.

SUMMARY OF THE INVENTION

In a broad aspect, therefore, the present invention relates to a moldable material including chipped or stripped rubber intermingled with a curable binder.

The moldable material may further include ground glass.

Preferably, the moldable material includes at least 35% by weight of said rubber strips or chips.

More preferably, the moldable material includes from 45 to 92% by weight of rubber chips or strips, and most preferably from 45 to 75% by weight of rubber chips or strips.

The moldable material of the present invention most preferably includes from about 5 to about 15% of a binder chosen from the group including aromatic urethane binders, aliphatic urethane binders, latex binders and epoxy binders.

A moldable material also preferably includes from about 0 to about 55% ground glass, more preferably from about 10% to about 45% ground glass.

In a practical embodiment, the material of the present invention includes about 65% rubber chips or strips, about 25% ground glass, and about 10% of an aromatic urethane binder.

The glass used in the material of the present invention is recycled bottle glass, ground to a particle size not exceeding 2 cm in its broadest dimension.

Moreover, the material of the present invention may further include silica, chipped or shredded plastics, basaltic aggregate, or other recyclable matter.

DESCRIPTION OF PREFERRED EMBODIMENTS

The present invention, as noted above, utilizes ground scrap rubber from automobile tires as its base. This type of rubber, known as SBR—Styrene Butadiene Rubber, may be used in a relatively pure state, without non-rubber inclusions, if it is obtained as scrap from rubber tire recapping facilities which grind excess rubber from tire carcasses before applying new tread surfaces. Alternatively, rubber from whole ground scrap tires may be used in the process of the present invention, in which case a wide variety of inclusions will be present, including rayon, polyester and nylon filaments, and steel wire from steel belting.

A wide range of rubber chip or strip sizes from tire recycling may be utilized in the present invention, and it is fair to say that virtually any rubber tire scrap may be utilized. For instance, in the case of rubber buffings from a recapping facility, strips of up to about 10 cm long by 5 cm wide, with a weight of 50–60 grams may be used, as an example of a large scrap strip, and in the case of ground whole tires, particle sizes of 1–6 mm may be used. It will be understood, however, that many smaller particles will be present in rubber strips or particles prepared by buffing or grinding.

It is, of course also possible to utilize virgin rubber in the present invention, for instance ethylene polymeric diamine monomer rubber, but this is more expensive and not preferred due to the high cost involved, and the fact that such an approach does not alleviate the garbage problem.

The amount of rubber used in the process of the present invention can vary from a low of about 35% or greater of total materials up to 100%, depending on the intended use of the finished product manufactured according to the present invention.

The majority of the remainder of material utilized in the present invention is ground glass scrap, made from recycled bottles originally containing beverages such as soft drinks, beer, wine or spirits. Moreover, in the process of the present invention up to 10% by volume of contaminants such as paper, plastic or steel caps is acceptable in the recycled glass portion. The glass is broken and ground to particle sizes of 0.5 to 4 mm, and it will be noted that any sharp edges of the glass will generally be ground down in the grinding process.

To hold together the glass and rubber in a cohesive mass, the present invention utilizes a binder such as an aromatic urethane, an aliphatic urethane or a rubber latex.

Aromatic urethanes such as diphenylmethane diisocyanate are suitable binders, but are generally intolerant to ultra violet degradation. Therefore, use of this binder should be for products that will not be exposed to the sun, for instance, underlay slabs for paving stones. Alternatively, product made with aromatic urethane binders may be coated to block UV radiation.

Aliphatic urethanes, on the other hand, are suitable for use in UV exposed areas, but tend to be more expensive than aromatic urethane.

Latex binders, such as those used in making running tracks, carpets and sheet goods, are readily available at fairly low cost but are weaker than urethane binders.

The present invention will be illustrated by the following comparative examples. All samples were prepared by weighing each components, placing same into an electrically driven Monarch 7 mortar mixer, and mixing for five minutes. The mixture was then placed into wooden molds, levelled and compacted to 80% of its original volume and cured at 21° C. for forty-eight hours. Samples were then tested. Each sample was a circular piece sixteen inches in diameter, two inches thick.

It will be noted, in regard to the method utilized to combine the components and produce molded articles according to the present invention, that heat and/or moisture may also be utilized to accelerate the curing of the binders, and thereby increase production efficiency.

TESTING METHODS

The samples were tested with the following equipment:
Scales
  Ohaus Harvard Trip Balance
  Gold Brand Sp901 platform scale.
Tensile Testing
  steel plates were bonded and clamped onto the samples. The sample was attached to a fixed apparatus and weights were progressively applied to the samples until rupture failure occurred. Measurements for both load and elongation were conducted.
Compressive Testing
  a ½ inch diameter mandrel was positioned onto the sample and loads were applied in 5 lb increments. The test was stopped when failure occurred or when the mandrel indented to 40%.
Bending Testing
  the room temperature samples were mounted horizontally onto the edge of a platform and a load was placed on the outer extremity. The bending occurred over a ½ inch radius and the angle of deflection was measured. Samples were also placed in a freezing compartment at −40° C. and the same test was conducted (simulates ASTM D 1739 which is described as low temperature flexibility).
Chemical Resistance
  ASTM D-471 immersion tests require that the samples be placed in the following solutions for a period of 30 days. These samples were tested in accordance with this test using gasoline, diesel fuel, motor oil, brake fluid, antifreeze, deicing salts, and 5% sulphuric acid and the results showed no effect with all but the brake fluid which had expansion and softening of the rubber and binder.

SAMPLES TESTED

The following is a list of samples and a description of the composition of each based on weight:

| Sample Number | Percent Rubber | Percent Glass | Percent Binder | | Comments |
|---|---|---|---|---|---|
| 101 | 45 | 45 | 10 | aromatic | Tire Buffings |
| 102 | 65 | 25 | 10 | aromatic | Tire Buffings |
| 103 | 92 | 0 | 8 | aromatic | Tire Buffings |
| 104 | 47 | 47 | 6 | aromatic | Tire Buffings |
| 105 | 35 | 55 | 10 | aromatic | Tire Buffings |
| 106 | 45 | 45 | 10 | aliphatic | Tire Buffings |
| 107 | 45 | 45 | 10 | aromatic | Tire Chip |
| 108 | 45 | 45 | 10 | aromatic | New SBR Chip |
| 109 | 45 | 45 | 10 | aromatic | EDPM |
| 110 | 45 | 45 | 10 | latex | Tire Buffings |

| Sample Number | Compression psi | Tensile psi | BENDING | |
|---|---|---|---|---|
| | | | Room Temperature | −40° C. |
| 101 | 1860 | 670 | pass | pass* |
| 102 | 1490 | 780 | pass | pass |
| 103 | 930 | 970 | pass | pass |
| 104 | 690 | 670 | pass | pass |
| 105** | 1920 | 460 | fail | fail |
| 106** | 2040 | 880 | pass | fail |
| 107 | 2100 | 870 | pass | fail |
| 108 | 1970 | 840 | pass | fail |
| 109 | 1620 | 640 | pass | pass |
| 110 | 720 | 460 | pass | pass |

*Visual cracks but not failure.
**Material crushed and maintained strength then increased.

In view of the results of the testing carried out, it will be observed that the most favorable results occurred utilizing tire buffings, in an amount greater than 35%, 10% aromatic urethane binder, and the remainder ground glass. Suitable binders for use in the present invention are Futura-tech P-8815 single component aromatic moisture cure urethane, and Futura-tech P8930 single component urethane adhesive. Other binders will be obvious to those skilled in the art, given the teachings of the present invention. Moreover, where increased rigidity is desired, an epoxy binder may be used. Plural component isocyanate and polyol resin blends may be used where UV resistance is particularly important.

It is to be understood that the examples described above are not meant to limit the scope of the present invention. It is expected that numerous variants will be obvious to the person skilled in the field to which the invention pertains without any departure from the spirit of the invention. The appended claims, properly construed, form the only limitation upon the scope of the invention.

We claim:
1. A moldable material consisting essentially of rubber chips or strips, ground glass, and curable binder, said rubber chips or strips being intermingled with said curable binder, said rubber chips or strips being present in a weight percent of from 45% to 92%, said ground glass being present in a weight percent not exceeding about 55%, said ground glass being recycled bottle glass ground to a particle size of 0.5 to 4 mm, said curable binder being present in a weight percent of from about 5% to about 15% and being selected from the group consisting of aromatic urethane binders, aliphatic urethane binders, latex binders, and epoxy binders.

2. A moldable material as claimed in claim 1, said moldable material consisting of said rubber chips or strips, said ground glass, and said curable binder.

3. A moldable material as claimed in claim 1, said rubber chips or strips being present in a weight percent of from 45% to 75%.

4. A moldable material as claimed in claim 1, said ground glass being present in a weight percent of from about 10% to about 45%.

5. A moldable material as claimed in claim 1, consisting essentially of about 65% rubber chips or strips, about 25% ground glass, and about 10% of an aromatic urethane binder.

6. A moldable material as claimed in claim 1, wherein said rubber is recycled rubber from tire buffings, in particles and strips up to 10 cm long and 5 cm wide.

7. A moldable material as claimed in claim 1, wherein said rubber includes chips of rubber from whole ground tires, and optionally includes nylon, rayon, polyester, steel or other tire components.

8. A moldable material as claimed in claim 1, said rubber being selected from the group consisting of recycled rubber from tire buffings, chips of rubber from whole ground tires, and mixtures thereof.

9. A moldable material as claimed in claim 1, said rubber having a particle size of 1 to 6 mm.

10. A moldable material as claimed in claim 1, said rubber being strips up to 10 cm long and 5 cm wide.

11. A moldable material as claimed in claim 1, said ground glass being present in a weight percent of about 25%.

* * * * *

UNITED STATES PATENT AND TRADEMARK OFFICE
CERTIFICATE OF CORRECTION

PATENT NO. : 5,693,413
DATED : December 2, 1997
INVENTOR(S) : Larry C. Hesterman, et al.

It is certified that error appears in the above-indentified patent and that said Letters Patent is hereby corrected as shown below:

Column 3, line 60, insert the centered heading "RESULTS".

Signed and Sealed this

Tenth Day of March, 1998

*Attest:*

BRUCE LEHMAN

*Attesting Officer*  Commissioner of Patents and Trademarks